US007281309B2

(12) United States Patent
Reynolds

(10) Patent No.: US 7,281,309 B2
(45) Date of Patent: *Oct. 16, 2007

(54) EXPLOSION RESISTANT WASTE CONTAINER

(75) Inventor: Herbert W. Reynolds, Ocean Isle Beach, NC (US)

(73) Assignee: Master Lite Security Products, Inc, Shallotte, NC (US)

( * ) Notice: Subject to any disclaimer, the term of this patent is extended or adjusted under 35 U.S.C. 154(b) by 184 days.

This patent is subject to a terminal disclaimer.

(21) Appl. No.: 10/944,028

(22) Filed: Sep. 17, 2004

(65) Prior Publication Data

US 2005/0103784 A1 May 19, 2005

Related U.S. Application Data

(62) Division of application No. 10/150,605, filed on May 17, 2002, now Pat. No. 7,014,059.

(51) Int. Cl.
*B21D 39/00* (2006.01)
*B23P 19/04* (2006.01)
*B65D 1/48* (2006.01)

(52) U.S. Cl. ........................ 29/455.1; 220/62.15; 86/50

(58) Field of Classification Search ............... 29/455.1, 29/560.1; 250/506.1; 27/3, 14; 376/272; 220/62.15, 920, 908; 86/50; 109/49.5
See application file for complete search history.

(56) References Cited

U.S. PATENT DOCUMENTS 4,432,285 A * 2/1984 Boyars et al. ............. 109/49.5
4,889,258 A * 12/1989 Yerushalmi ............ 220/560.01
5,722,149 A * 3/1998 Lesage et al. ................ 29/505
6,299,950 B1 * 10/2001 Byington et al. .......... 428/34.5
6,438,190 B2 * 8/2002 Gluschke et al. ........... 376/260
6,518,585 B1 * 2/2003 Gluschke et al. ........ 250/506.1
2005/0252915 A1 * 11/2005 Schmidt et al. ............ 220/88.1

OTHER PUBLICATIONS

Sherry L. Harowitz, An Island And An Icon, Jul. 2000.
Terry Priston, Panel Weights New Methods for Security in Times Square, Dec. 31, 2001.
Brian Michael Jenkins, Protecting Public Surface Transportation Against Terrorism and Serious Crime: An Executive Overview, Oct. 2001.
Mike Sunnucks, Metro Debuts Blast-Resistant Trash Cans, Jan. 28, 2002.
Mistral Group, Blastguard for Public Safety.
Mistral Group, Public Safety Semi-Vented BlastGuard Trash Containers.
Total Security Service International, Inc., Bomb Mitigation.

* cited by examiner

*Primary Examiner*—David P. Bryant
*Assistant Examiner*—Christopher M Koehler
(74) *Attorney, Agent, or Firm*—John A. Artz; Dickinson Wright PLLC

(57) ABSTRACT

An explosion resistant waste container (10) includes an outer open-topped container (16). The outer open-topped container (16) is sized to receive an inner open-topped container (12) and leave a space therebetween. Both the outer open-topped container (16) and the inner open-topped container (12) are cylinders made of sufficiently strong materials, e.g. 11 gauge steel, for withstanding the forces of an explosion. A reinforcing material (14), e.g. reinforced concrete, is disposed within the space between the outer open-topped container (16) and the inner open-topped container (12). The outer open-topped container (16) and the reinforcing material (14) reinforce the inner open-topped container (12) so as to provide greater resistance to deformation caused by explosions and to shield surrounding persons and property from the explosive forces.

8 Claims, 4 Drawing Sheets

EXPLOSION RESISTANT WASTE CONTAINER

CROSS-REFERENCE TO RELATED APPLICATIONS

This is a division of U.S. patent application Ser. No. 10/150,605, filed on May 17, 2002, now U.S. Pat No. 7,014,059.

TECHNICAL FIELD

The present invention relates generally to waste containers, and more particularly to waste containers that can withstand explosive forces and safely direct these forces away from surrounding persons and property.

BACKGROUND OF THE INVENTION

Waste containers are well known. These containers may take a variety of forms for use in a variety of places.

In particular, large waste containers are commonly used in places frequented by the public. For example, these waste containers may be found in airports, government buildings, hospitals, schools, street corners of highly populated cities, and at various public events.

A serious problem concerning these waste containers is that a bomb can be surreptitiously hidden therein- and subsequently detonated for the purpose of harming surrounding persons or property. Current waste containers may not be sufficiently strong to withstand the explosions. For instance, current waste containers may either disintegrate or fragment into airborne shards. As a result, many persons within a blast perimeter of the bomb may suffer serious bodily injury or death. Of course, valuables and other property within the immediate area may also be damaged or destroyed.

Therefore, a need exists for a waste container that maintains its integrity when subjected to an explosion and directs explosive forces away from surrounding persons and property.

SUMMARY OF THE INVENTION

The present invention provides an explosion resistant waste container. The waste container includes an outer open-topped container and an inner open-topped container disposed within the outer-open topped container. Both the outer open-topped container and the inner open-topped container are cylinders made of sufficiently strong materials, e.g. 11 gauge steel, for withstanding the forces of an explosion. A reinforcing material, e.g. reinforced concrete, is disposed within a space between the outer open-topped container and the inner open-topped container. The reinforcing material reinforces the inner open-topped container so as to provide greater resistance to deformation caused by explosions.

One advantage of the present invention is that it can direct explosive forces away from surrounding persons and property. Yet another advantage of the present invention is that it can withstand these forces without experiencing extensive damage and then be subsequently reused. Of course, another advantage of the present invention is that it can function in a normal manner as a waste receptacle for receiving and storing waste therein.

Other advantages of the present invention will become apparent when viewed in light of the detailed description of the preferred embodiment when taken in conjunction with the attached drawings and appended claims.

DESCRIPTION OF THE PREFERRED EMBODIMENT

Figure 1A:
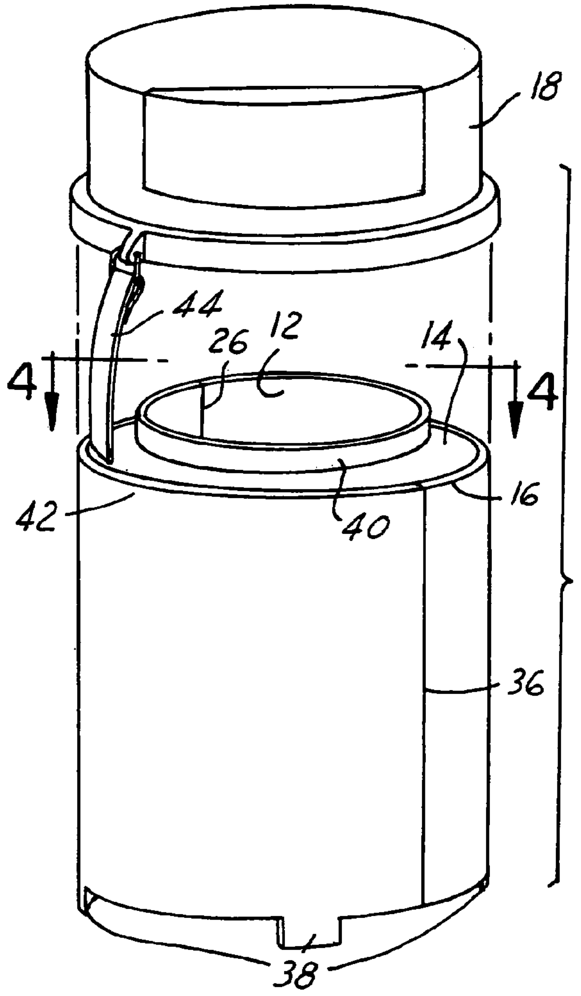
FIG. 1A is a perspective view of an explosion resistant waste container according to a preferred embodiment of the present invention.

In the following figures, the same reference numerals are used to identify the same components in the various views.

Referring to FIG. 1A, there is generally shown an explosion resistant waste container 10 according to a preferred embodiment of the present invention. The waste container 10 is normally used for receiving and storing waste. In addition, the waste container 10 can shield surrounding persons and property from explosions originating therein.

The waste container 10 generally includes an inner open-topped container 12, a reinforcing material 14, and an outer open-topped container 16.

Figure 1B:
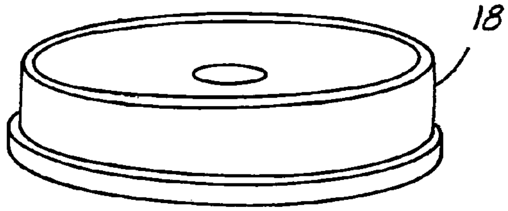
FIG. 1B is a perspective view of a funnel lid according to a preferred embodiment of the present invention.

The waste container 10 also preferably includes a lid 18 that releasably attaches to at least one of a lip portion 40 of the inner open-topped container and a rim portion-42 of the outer open-topped container 16. The lid 18 may be a hood (as shown in FIG. 1A), a funnel (as shown in FIG. 1B), or other suitable covers. The lid 18 preferably is made of a heavy-duty polyethylene. However, it is obvious that the lid 18 may be made of other suitable materials.

Preferably, the lid 18 is attached to the reinforcing material 14 of the waste container 10 by a tether 44. The tether 44 is preferably a nylon strap having a first end embedded within the reinforcing material 14 and a second end attached to the lid 18 (as shown in FIG. 1A). Of course, the first end of the tether 44 may instead be attached to either the inner open-topped container 12 or the outer open-topped container 16 as desired. Furthermore, the second end of the tether 44 may be attached to either an outer portion of the lid (as shown in FIG. 1A) or an inside portion of the lid 18. A rivet or other suitable fasteners may be used to attach the ends of the tether 44 to their respective surfaces.

Figure 2A:
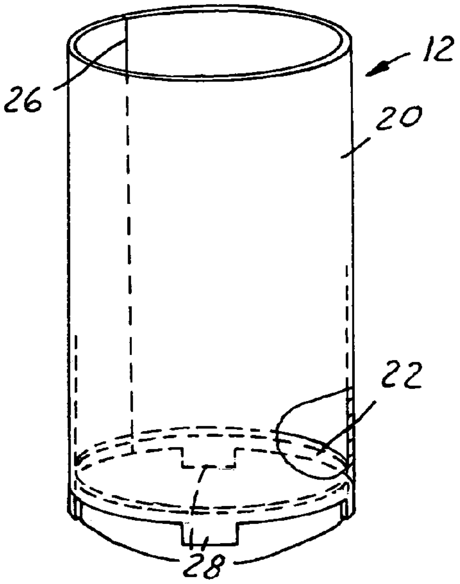
FIG. 2A is a perspective view of an inner open-topped container of an explosion resistant waste container according to a preferred embodiment of the present invention.

Referring now to FIG. 2A, there is shown an inner open-topped container 12 of the waste container 10 according to the preferred embodiment of the present invention. The inner open-topped container 12 is made of a sufficiently strong material that can be subjected to an explosion without experiencing substantial deformation. Preferably, this material is 11 gauge steel coated with a powder for preventing rust or corrosion that may weaken the strength of the steel. The 11 gauge steel can provide sufficient strength without adding undesired weight to the waste container 10.

Of course, the inner open-topped container 12 may be made of various other suitable materials that are strong enough for withstanding explosions. For example, the inner open-topped container may be made of a heavier 7 gauge steel. Also, the container 12 may be made of a nylon or plastic material reinforced with an aramid fiber, such as KEVLAR.

Figure 2B:
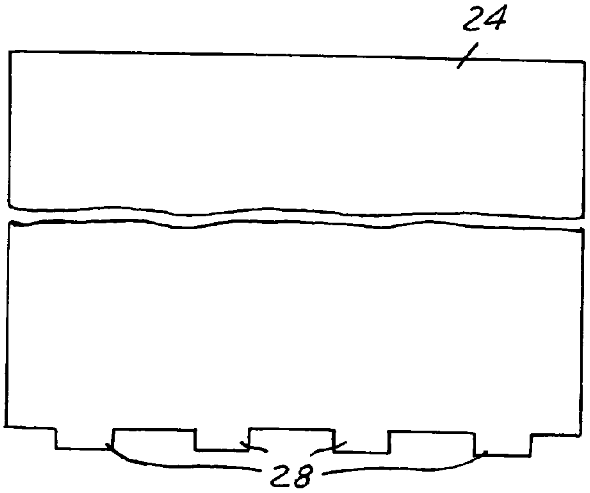
FIG. 2B is a plan view of a first flat sheet of metal used for forming the inner open-topped container, according to a preferred embodiment of the present invention.

The inner open-topped container 12 preferably includes an inner cylinder 20 and a bottom inner plate 22 attached to a lower end portion of the cylinder 20. The inner cylinder 20 is preferably formed by rolling a first flat metal sheet 24 (as shown in FIG. 2B) and then welding together the opposing ends of the sheet 24 at an inner seam 26.

As is known in the art, the inner cylinder 20 may not have a well formed circular diameter after rolling the sheet 24 only one time. In this regard, the inner cylinder may slightly bow radially outward along the inner seam 26 where the opposing ends of the sheet 24 are joined. Therefore, it may be necessary to re-roll the inner cylinder 20 a second time after welding the opposing ends together so as to allow for an improved circular cross-section.

Although FIG. 2A illustrates a circular cross-section of the inner cylinder 20, it will be obvious to one skilled in the art that the cross-section of inner cylinder 20 may be shaped otherwise and have multiple sides as long as the inner cylinder 20 has sufficient thickness and strength for withstanding the forces of an explosion.

Figure 2C:
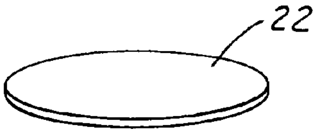
FIG. 2C is a perspective view of a bottom inner plate used for forming the inner open-topped container, according to a preferred embodiment of the present invention.

The bottom inner plate 22 (as shown in FIG. 2C) is preferably welded to the lower end portion of the cylinder 20. However, the bottom inner plate 22 may be attached to the inner cylinder 20 by other suitable fastening methods.

As best shown in FIG. 1A, the inner open-topped container 12 has a lip portion 40 extending upward beyond the reinforcing material 14. A user may wrap a top end of a trash bag around the lip portion 40 for the purpose of securing the trash bag to the container 10. Also, a portion of the lid 18 may be used to pinch the trash bag against the lip portion 40 and hold the trash bag in place.

Figure 3A:
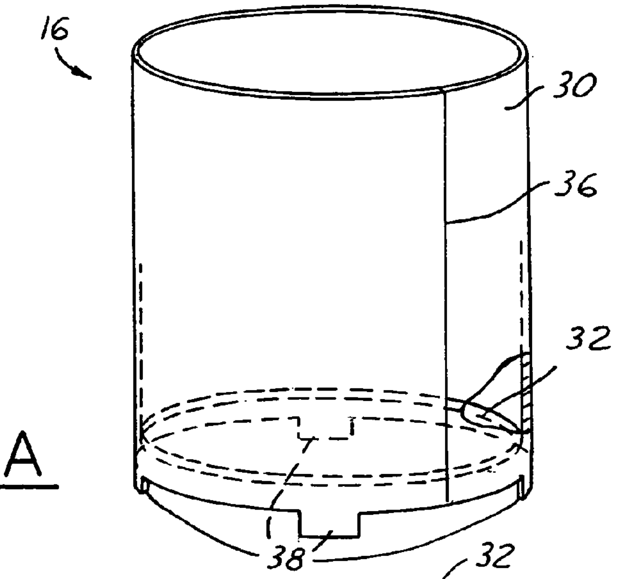
FIG. 3A is a perspective view of an outer open-topped container of an explosion resistant waste container according to a preferred embodiment of the present invention.
Figure 3C:
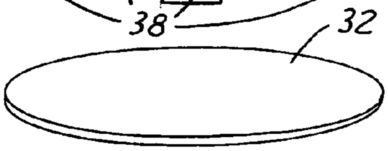
FIG. 3C is a perspective view of a bottom outer plate used for forming the outer open-topped container, according to a preferred embodiment of the present invention.

Referring now to FIG. 3A, there is shown an outer open-topped container 16 of the waste container 10 according to a preferred embodiment of the present invention. Similar to the inner open-topped container 12, the outer open-topped container is made of a material capable of withstanding the forces of an explosion without experiencing substantial deformation. This material preferably is 11 gauge steel coated with corrosion resistant powder and alternatively may be any other suitable material.

Figure 3B:
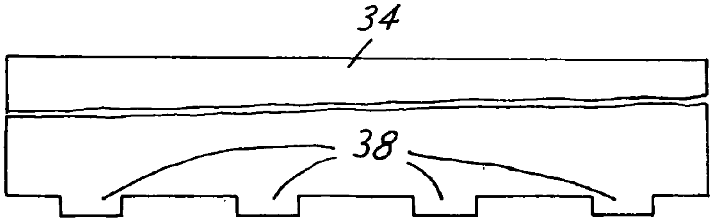
FIG. 3B is a plan view of a second flat sheet of metal used for forming the outer open-topped container, according to a preferred embodiment of the present invention.

Furthermore, the outer open-topped container preferably is formed in a similar manner as the inner open-topped container 12. The outer open-topped container 16 preferably includes an outer cylinder 30 and a bottom outer plate 32 attached to a lower end portion of the outer cylinder 30. The outer cylinder 30 is preferably formed by rolling a second flat metal sheet 34 (as shown in FIG. 3B) and then welding together the opposing ends of the sheet 34 at an outer seam 36. Once the opposing ends are welded together, the outer cylinder 30 may be re-rolled for providing an improved circular cross-section of the outer cylinder 30. Furthermore, re-rolling the outer cylinder 30 may smooth the outer seam 36 so as to provide a pleasing aesthetic appearance.

It will also be obvious to one skilled in the art that the cross-section of the outer open-topped cylinder 16 may be circular, non circular, or multiple-sided as long as it has sufficient thickness and strength for withstanding the forces of an explosion. It is also obvious that the cross-sections of the two cylinders 12, 16 could be different from each other, so long as sufficient space is left between them for the reinforcing material 14.

The outer open-topped cylinder 16 also includes the bottom outer plate 32 that is welded to a lower end portion of the outer cylinder 30. Obviously, the bottom outer plate 32 may be attached to the lower end portion by various other suitable fastening methods.

The outer open-topped container 16 is sized for receiving the inner open-topped container 12 therein and leaving a space therebetween. The space between the surfaces of the outer open-topped container 16 and the surfaces of the inner open-topped container 12 is provided for by at least one positioning element 28.

Preferably, the positioning elements 28 are an inner plurality of legs extending from the first flat metal sheet 24 (as shown in FIGS. 2A and 2B). However, the positioning element 28 may be a variety of other suitable devices that provide space between surfaces of the containers 12, 16. For example, the positioning elements 28 may be a plurality of columns integrally formed as part of the bottom outer plate 22. Alternatively, the positioning element 28 may simply be a brick, a plate, or any other suitable device that offsets surfaces of the inner open-topped container 12 from surfaces of the outer open-topped container 16. Although four legs are shown, it is understood that any number of legs could be utilized.

The outer open-topped container 16 may also include an outer plurality of legs 38 for positioning the waste container 10 in an upright position. Also, these legs 38 elevate the waste container 10 so as to allow a person to slide a dolly underneath the waste container 10 for transporting the waste container: 10. These legs 38 may be integrally formed as part of the outer cylinder 30. Alternatively, the legs 38 may be integrally formed as part of the bottom outer plate 32. Of course, the legs 38 may be coupled to other portions of the outer open-topped cylinder or even completely omitted therefrom. Although four legs 38 are shown, it is understood that any number of legs 38 can be used.

Figure 4:
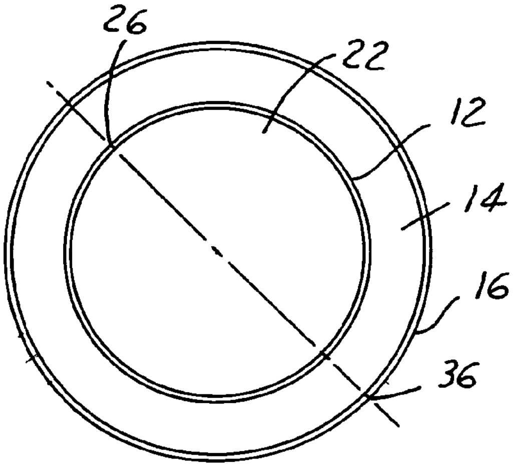
FIG. 4 is a top view of the explosion resistant waste container as shown in FIG. 1A, taken along line 4-4.

Referring now to FIG. 4, there is shown a top view of the waste container 10 of FIG. 1A, as taken from the perspective of line 4-4. The inner open-topped container 12 is preferably placed within the outer open-topped container 16 such that the inner seam 26 of the inner open-topped container 12 is positioned out of phase with the outer seam 36 of the outer open-topped container 16. Arranging the seams 26, 36 in this manner increases the strength of the container 10 thereby increasing the container's resistance to deformation when subjected to an explosion. Preferably, the seams 26, 36 are offset 180 degrees from each other for providing optimal resistance to deformation. Of course, the seams 26, 36 may be offset from each other at other angles that enhance the integrity of the waste container 10.

The waste container 10 further includes a reinforcing material 14 disposed within the space between the inner open-topped container 12 and the outer open-topped container 16. The reinforcing material 14 preferably fills in the entire space between the inner open-topped container 12 and outer open-topped container 16. Preferably, the reinforcing material 14 is concrete reinforced with a synthetic fiber, e.g. fiberglass. Of course, the reinforcing material 14 may be composed of various other materials appropriate for reinforcing the inner open-topped container 12.

The positioning element 28 preferably provides a two inch clearance between the surfaces of the containers 12, 16. This clearance allows for a sufficient thickness of the reinforcing material 14 for strengthening the inner open-topped container 12 without adding undesired weight to the waste container 10. Obviously, the size of the space between the containers 12, 16 and the amount of reinforcing material 14 may be varied as desired.

Figure 5:
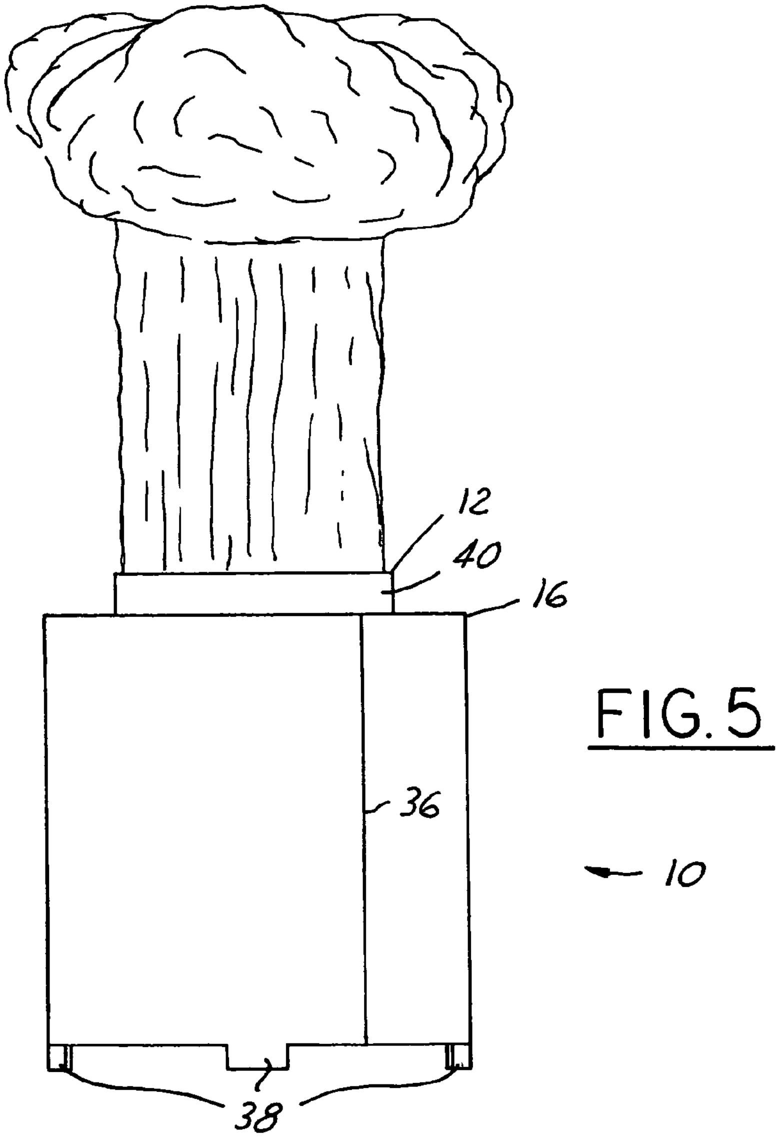
FIG. 5 is a perspective view of an explosion resistant waste container being subjected to an explosion.

FIG. 5 illustrates the waste container 10 being subjected to an explosion. When a bomb is detonated within the waste container 10, the container 10 directs the explosive forces away from the surrounding persons and property within a horizontal perimeter of the container 10. Both the reinforcing material 14 and the outer open-topped container 16 increase the inner open-topped container's 12 resistance to deformation. As a result, the inner open-topped container 12 maintains its shape and channels the blast forces upward, in the only direction the forces can go.

The blast forces may destroy the lid 18 and propel objects within the container 10 relatively straight upward. However, the surrounding persons and property within the horizontal perimeter of the container are sufficiently protected from the explosion. Furthermore, although the lid 18 may be destroyed, the rest of the container 10 remains in tact and consequently may be reused.

Figure 6:
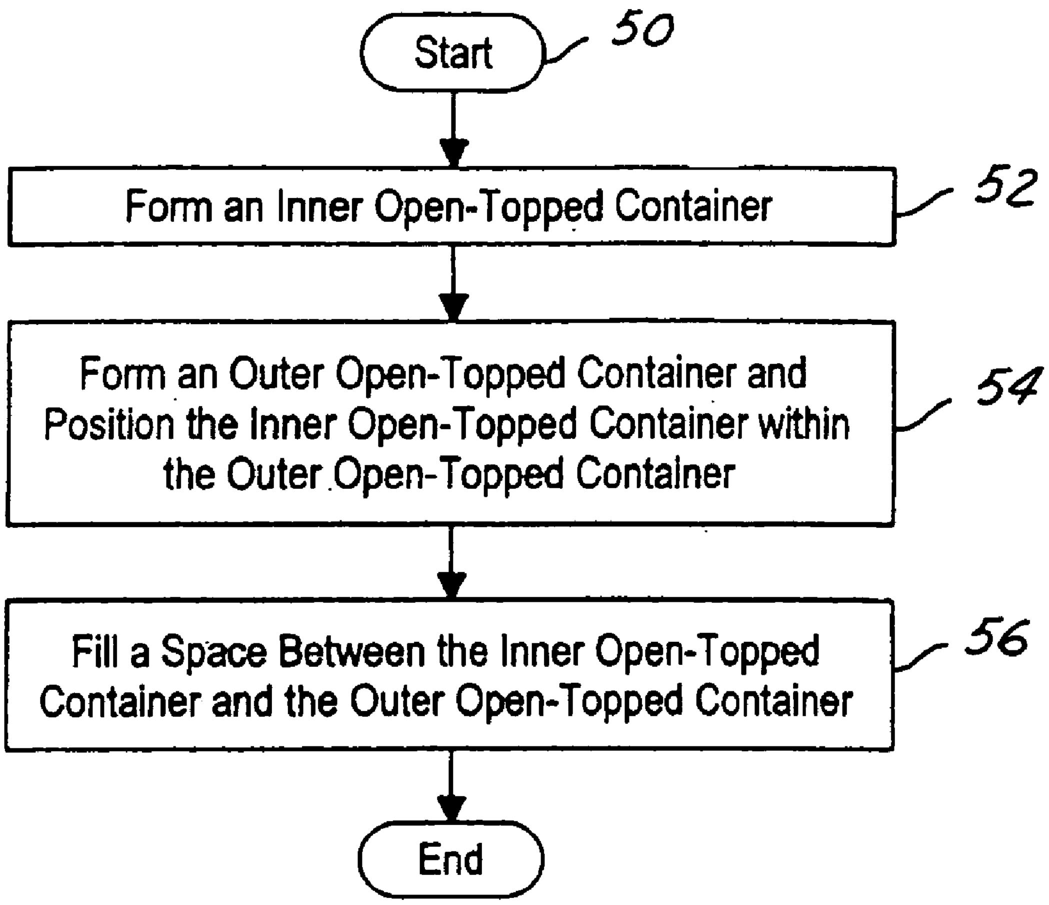
FIG. 6 is a flowchart showing a method for manufacturing an explosion resistant waste container according to a preferred embodiment of the present invention.

Referring now to FIG. 6, a flowchart shows a method for manufacturing an explosion resistant waste container 10 in accordance with a preferred embodiment of the present invention. The method is initiated at step 50 and then immediately proceeds to step 52.

In step 52, the inner open-topped container 12 (as shown in FIG. 2) of the waste container 10 is formed. This step is preferably accomplished by first providing a first flat metal sheet 24 (as shown in FIG. 2B). Then, the first flat metal sheet 24 is rolled into an inner cylinder 20. Thereafter the opposing ends of the sheet 24 are welded together at an inner seam 26. After welding the opposing ends together, the inner cylinder 20 may be re-rolled for smoothing the inner seam 26 and providing an improved circular cross-section of the inner cylinder 20. Then, a bottom inner plate 22 (as shown in FIG. 2C) is welded to a lower end portion of the inner cylinder 20. After forming the inner open-topped container 12, the sequence proceeds to step 54.

In step 54, an outer open-topped container 16 (as shown in FIG. 3A) of the waste container 10 is formed. The outer open-topped container 16 is preferably formed in a similar manner as the inner open-topped container 12. In particular, a second flat metal sheet is first provided. The second flat metal sheet 34 (as shown in FIG. 3B) is then rolled into an outer cylinder 30. The opposing ends of the sheet 34 are welded together at an outer seam 36. If it is necessary, the outer cylinder 30 may be re-rolled to smooth the outer seam 36 and provide the desired cross-section of the outer cylinder 30.

In the preferred embodiment, the inner open-topped container 12 is welded to the bottom outer plate 32 before the bottom outer plate 32 is welded to the lower end portion of the outer cylinder 30.

Specifically, the inner open-topped container 12 is welded to the bottom outer plate 32 with one or more positioning elements 28 placed therebetween. The positioning elements 28 provide space between surfaces of the inner open-topped container 12 and the outer open-topped container 16. The positioning elements 28 preferably comprise a plurality of legs integrally formed as part of the inner open-topped container 12. These legs could also be separately made and welded to the bottom outer plate 32.

Of course, the positioning elements 28 may be other suitable devices for providing space between surfaces of the containers 12, 16. For example, the positioning element 28 may be a plurality of columns integrally formed as part of the bottom outer plate 32. Furthermore, the positioning element 28 may simply be a brick or a plate placed between the surfaces of the containers 12, 16.

The bottom outer plate 32 is positioned within the outer cylinder 16 so as to place the seams 26, 36 in the desired position out of phase. Preferably, these seams 2.6, 36 are placed 180 degrees out of phase but may be positioned otherwise as desired. Once the seams 26, 36 are in the desired position, the bottom outer plate 32 is welded to the lower end portion of the outer cylinder 30.

After the outer open-topped container 16 is formed and the inner open-topped container 12 is positioned within the outer open-topped container 16, the sequence proceeds to step 56.

In step 56, a reinforcing material 14 is inserted into the space between the inner open-topped container 12 and the outer open-topped container 16. Preferably, this step is accomplished by pouring a slurry of reinforced concrete into the space between the inner open-topped container 12 and the outer open-topped container 16.

Figure 7:
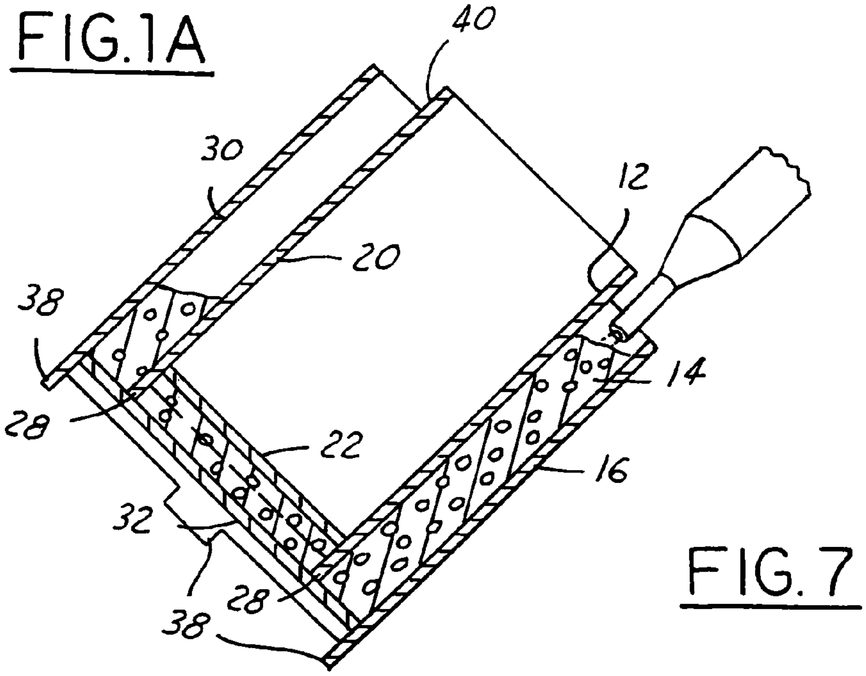
FIG. 7 is a cross-sectional view of a step in the manufacturing process of an explosion resistant waste container in accordance with a preferred embodiment of the present invention.

As shown in FIG. 7, in the preferred embodiment, the inner open-topped container 12 and the outer open-topped container 16 are tilted at an angle, preferably about 45 degrees, while the slurry is initially poured into the space between the inner open-topped container 12 and the outer open-topped container 16. Tilting both containers 12, 16 allows for the slurry to fill in all spaces between the containers 12, 16. The inner open-topped container 12 is preferably held in place by the weld attachment between the positioning elements 28 and the bottom outer plate 32.

Tilting the containers 12, 16 assures that the slurry will fill in the space between the bottom inner plate 22 of the inner open-topped container 12 and the bottom outer plate 32 of the outer open-topped container 16.

Furthermore, as the slurry is being poured, a conventional vibration device is preferably used to agitate the slurry and remove any voids or air pockets therein. Removing the voids allows for a solid concrete wall to be formed thereby increasing the strength of the reinforcing material 14. As a result, the integrity of the inner open-topped container 12 is also strengthened.

The containers 12, 16 are positioned in their upright positions when sufficient slurry has been poured into the space such that the slurry may begin to spill out of the waste container 10. Once the containers 12, 16 are in the upright position, the remainder of the space is completely filled with the slurry. Thereafter, the slurry is cured so as to strengthen the integrity of the inner open-topped container 12.

While particular embodiments of the invention have been shown and described, numerous variations and alternate embodiments will occur to those skilled in the art. Accordingly, it is intended that the invention be limited only in terms of the appended claims.

What is claimed is:

1. A method of manufacturing an explosion-resistant waste container comprising the steps of:

forming a first open-topped container, said container being made from metal material with a first longitudinal welded seam thereon;

forming a second open-topped container, said container being made from a metal material with a second longitudinal welded seam thereon;

positioning said first open-topped container in said second open-topped container leaving an annular space therebetween;

orientating the position of said first and second open-topped container relative to one container such that said first longitudinal welded seam is about 180° out-of-phase relative to said second longitudinal welded seam; and filling said annular space with a reinforcing material.

2. The method of claim 1 wherein said reinforcing material is concrete.

3. The method of claim 1 further comprising the step of securing said first open-topped container within said second open-topped container prior to filling said annular space with reinforcing material.

4. The method of claim 3, wherein said second open-topped container comprises a piece of metal material formed into a cylindrical shape and a bottom plate member, and wherein said first open-topped container is secured to said bottom plate member before said first open-topped cylinder is positioned within said second open-topped container.

5. The method of claim 1 further comprising tilting said first and second open-topped containers in order to assist in filling said annular space with reinforcing material.

6. A method of manufacturing an explosion resistant waste container comprising the steps of:

forming a first open-topped container, said container being made from metal material with a first longitudinal welded seam thereon;

forming a second open-topped container, said container being made from a metal material with a second longitudinal welded seam thereon;

positioning said first open-topped container in said second open-topped container leaving annular space therebetween;

orientating the position of said first and second open-topped container relative to one container such that said first longitudinal welded seam is about 180° out-of-phase relative to said second longitudinal welded seam; and filling said annular space with a reinforcing material;

wherein said second open-topped container comprises a piece of metal material formed into a cylindrical shape and a bottom plate member, and wherein said first open-topped container is secured to said bottom plate member before said first open-topped cylinder is positioned within said second open-topped container.

7. The method in claim 6 further comprising tilting said first and second open-topped containers in order to assist in filling said annular space with reinforcing material.

8. The method of claim 6 wherein said reinforcing material is concrete.

* * * * *